3,087,913
Patented Apr. 30, 1963

3,087,913
COPOLYMERS OF TRIOXANE AND VINYL ETHERS
Raymond J. Kray and Charles A. De Fazio, Summit, N.J., assignors to Celanese Corporation of America, New York, N.Y., a corporation of Delaware
No Drawing. Filed Mar. 11, 1959, Ser. No. 798,589
15 Claims. (Cl. 260—73)

This invention relates to novel copolymers of high thermal stability and particularly to copolymers of trioxane.

Polyoxymethylene polymers, having recurring

—CH₂O— units have been known for many years. They may be prepared by the polymerization of anhydrous formaldehyde or by the polymerization of trioxane which is a cyclic trimer of formaldehyde.

Trioxane may be polymerized to produce a moldable polymer of high thermal stability, particularly in the presence of a boron fluoride containing catalyst such as a boron fluoride coordinate complex with an organic compound in which oxygen or sulfur is the donor atom.

It has now been found that useful moldable polymers comprising recurring oxymethylene groups and recurring ethylene groups in which one carbon atom has an etheric substituent as a side chain, may be obtained by copolymerizing trioxane with a vinyl ether.

While it is not desired to be bound by any particular theory of operation, it is believed that the vinyl ether

loses its double bond and links to the carbon or oxygen atom of an oxymethylene group. Thus, in any given chain there will be ether-substituted ethylene groups linked to two carbon atoms of the two oxymethylene groups:

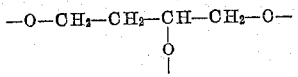

ether substituted ethylene groups linked to two oxygen atoms of two oxymethylene groups:

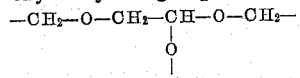

ether substituted ethylene groups linked in either direction to the oxygen atom of one oxymethylene group and the carbon atom of another:

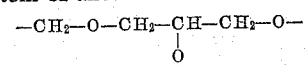

or

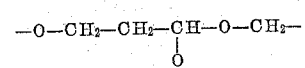

In addition, there will, of course, be oxymethylene groups linked to each other and ether-substituted ethylene groups linked to each other.

The preferred vinyl ethers used as comonomers are those having between about 1 and 20 carbon atoms linked to an oxyvinyl group. Among the specific vinyl ethers which may be used are the alkyl vinyl ethers, such as isobutyl vinyl ether, ethyl vinyl ether, n-propyl vinyl ether, methyl vinyl ether, t-butyl vinyl ether, n-dodecyl vinyl ethyl, 2-ethylhexyl vinyl ether, 1,2-dimethyl propyl vinyl ether, n-hexyl vinyl ether, 1,2,2-trimethyl propyl vinyl ether, 2-ethylbutyl vinyl ether, 1,3-dimethylbutyl vinyl ether, 1-methyl heptyl vinyl ether, nonyl vinyl ether, n-decyl vinyl ether, 1-methyl-4-ethyl octyl vinyl ether, n-tetradecyl vinyl ether, n-hexadecyl vinyl ether, n-octadecyl vinyl ether; substituted alkyl vinyl ethers, such as 2-chloroethyl vinyl ether, 2-methoxyethyl vinyl ether, 2-ethoxyethyl vinyl ether, 2,2,2-trifluoroethyl vinyl ether, α-phenyl ethyl vinyl ether; aryl vinyl ethers, such as phenyl vinyl ether; cycloalkyl vinyl ethers, such as cyclohexyl vinyl ether; cyclic vinyl ethers (in which case the ether side-chain has its opposite end linked to the other carbon atom of the ethylene group), such is dihydropyran and 2-ethoxy dihydropyran; alkenyl vinyl ethers (in which case cross-linking is possible), such as divinyl ether, allyl vinyl ether and the divinyl ether of ethylene glycol.

The preferred catalysts used in the preparation of the desired copolymers are the boron fluoride coordinate complexes with organic compounds in which oxygen or sulfur is the donor atom.

The coordinate complexes of boron fluoride may, for example, be a complex with an alcohol, a phenol, an acid, an ether, an acid anhydride, an ester, a ketone, an aldehyde, a dialkyl sulfide or a mercaptan. Boron fluoride etherate, the coordinate complex or boron fluoride with diethyl ether is the preferred coordinate complex. Boron fluoride dibutyl etherate is also highly desirable. The boron fluoride complexes which may be used include complexes with ethanol, with methanol, with propanol, with butanol, with methyl acetate, with ethyl acetate, with phenyl acetate, with benzoic acid, with acetic anhydride, with acetone, with methylethyl ketone, with dimethyl ether, with methylphenyl ether, with acetaldehyde, with chloral, with dimethyl sulfide and with ethyl mercaptan.

Coordinate complexes of boron fluoride with water, such as boron fluoride monohydrate, boron fluoride dihydrate and boron fluoride trihydrate may also be used.

The coordinate complex of boron fluoride should be present in the polymerization zone in an amount such that its boron fluoride content is between about 0.001 and about 1.0 weight percent based on the weight of trioxane in the polymerization zone. Preferably, amounts between about 0.003 and about 0.1 weight percent should be used.

The trioxane and vinyl ether in the reaction zone are preferably anhydrous or substantially anhydrous. Small amounts of moisture, such as may be present in commercial grade feed materials or may be introduced by contact with atmospheric air will not prevent polymerization, but should be removed for best yields.

In one embodiment of this invention the trioxane is polymerized in its molten state with the vinyl ether and catalyst dissolved therein. Since vinyl ethers form homopolymers rapidly, it is preferred to add the vinyl ether slowly to a body of molten trioxane. The preferred temperature for such polymerization is between about —5° C. and about 90° C. The period of reaction for such polymerization may vary from about 5 minutes to about 120 hours. Pressures from subatmospheric to about 100 atmospheres, or more, may be used, although atmospheric pressure is preferred.

In another embodiment of this invention, the trioxane, comonomer and catalyst are dissolved in a common anhydrous solvent, such as n-heptane, and permitted to react. In this embodiment it is also advantageous to add the vinyl ether slowly. The temperature for solution polymerization of this type may vary from about 40° C. to about 80° C. The period of reaction in such polymerization may vary from about 1 hour to about 8 hours.

In producing the copolymers of this invention the mol ratio of the vinyl ether may vary from about 0.005 to about 95 mols of vinyl ether per mol of trioxane in the reaction zone. Preferably, the mol ratio may vary from about 10 to about 0.1 mol of vinyl ether per mol of trioxane. The copolymers produced may contain from 0.5 geneously incorporated into about 200 parts by weight of the said sheet. The cross-linking is carried out in about 30 minutes at a temperature of about 150° C. After storage for about 24 hours at room temperature, the sheet is again heated for about 10 hours at a temperature of about 100° C. The mechanical properties of a test sheet are as follows:

| | |
|---|---|
| Thickness of the test sheet_____mm__ | 3.5 |
| Tensile strength_____kg./cm.$^2$__ | 110 |
| Breaking elongation_____percent__ | 350 |
| Load at 20% elongation_____kg./cm.$^2$__ | 9 |
| Load at 300% elongation_____kg./cm.$^2$__ | 96 |
| Elasticity _____percent__ | 38 |
| Shore hardness_____degrees__ | 62 |
| Permanent elongation_____percent__ | 7 |

*Example 3*

About 500 parts by weight of a polythioether having an OH number of about 53 prepared by self-condensation of thiodiglycol, are dehydrated for about 1 hour at a temperature of about 130° C. and in vacuo at about 15 mm. of mercury. About 12 parts by weight of stearic acid are then dissolved in the melt and the temperature is allowed to drop to about 86° C. About 53.8 parts by weight of hexamethylene diisocyanate are then added. The mixture is stirred for about 15 minutes and the temperature reduced to about 78° C. At this stage, a solution of about 8 parts by weight of 4,4'-diaminodiphenyl methane in about 100 g. of the above polythioether is added all at once to the reaction mixture. The procedure as described in Example 1 is then followed. About 80 parts by weight of carbon black and a mixture of about 1.5 parts by weight of paraformaldehyde and about 0.4 part by weight of zinc chloride are homogeneously incorporated into about 200 parts by weight of the modified polythioether thus obtained. After pressing at a temperature of about 150° C., a test sheet having the following mechanical properties is obtained:

| | |
|---|---|
| Thickness of the test sheet_____mm__ | 4 |
| Tensile strength_____kg./cm.$^2$__ | 105 |
| Breaking elongation_____percent__ | 360 |
| Elasticity _____do____ | 50 |
| Permanent elongation_____do____ | 4 |

*Example 4*

The procedure described in Example 2 is followed, using about 500 parts by weight of an hydroxyl terminated polythioether having an OH number of about 53, about 12 parts by weight of stearic acid and about 55.6 parts by weight of tolylene-2,4-diisocyanate. Finally, about 10 parts by weight of 4,4'-diaminodiphenyl methane in about 100 parts by weight of the same hydroxyl terminated polythioether having an OH number of about 53 are added, as described in Example 2 and the storable material is treated as described in that example. Before pressing at a temperature of about 150° C., about 80 parts by weight of carbon black and about 1.5 parts by weight of paraformaldehyde are dispersed homogeneously in about 200 parts by weight of the modified polythioether. A test sheet which has the following mechanical properties is obtained:

| | |
|---|---|
| Thickness of the test sheet_____mm__ | 3.5 |
| Tensile strength_____kg./cm.$^2$__ | 108 |
| Breaking elongation_____percent__ | 480 |
| Load at 20% elongation_____kg./cm.$^2$__ | 3 |
| Load at 300% elongation_____kg./cm.$^2$__ | 58 |
| Shore hardness_____degrees__ | 56 |
| Elasticity _____percent__ | 40 |
| Permanent elongation_____do____ | 7 |

*Example 5*

About 400 parts by weight of polypropylene ether glycol having an OH number of about 60 are dehydrated for about 30 minutes at a temperature of about 130° C. and in vacuo at from about 15 to about 20 mm. of mercury. The temperature is allowed to fall to about 88° C. and about 3.6 parts by weight of water and finally about 70 parts by weight of a technical mixture of 70% tolylene-2,4-diisocyanate and 30% tolylene-2,6-diisocyanate are added. After stirring for about 10 minutes at a temperature of about 90° C., a melt of about 1 part by weight of diamino-diphenyl methane is also added. The processing steps are followed in accordance with those steps described in Examples 1 to 4.

About 80 parts by weight of carbon black and a homogeneous mixture of about 3 parts by weight of paraformaldehyde and about 3 parts by weight of dimeric tolylene-2,4-diisocyanate are incorporated into about 200 parts by weight of the storable material. The mixture is cured for about 30 minutes at a temperature of about 150° C. A test sheet having the following mechanical values is obtained:

| | |
|---|---|
| Thickness of the test sheet_____mm__ | 4.2 |
| Tensile strength_____kg./cm.$^2$__ | 135 |
| Breaking elongation_____percent__ | 320 |
| Shore hardness_____degrees__ | 84 |
| Elasticity _____percent__ | 42 |
| Permanent elongation_____do____ | 8 |

The extraordinary resistance of the products obtained by the process of the invention to hydrolytic influences becomes quite clear from the following comparison. For example, a plastic which is prepared from an isocyanate-modified polyester and cross-linked with formaldehyde (in dices of 0.4 mm.) is changed into a wax-like material after being boiled in water for a period of about 56 hours, and the same material is converted into a brown resin after being boiled in water for about 162 hours. The acid number of the mother liquor and of the soild substances after being boiled in water corresponds to about ¼ to ⅓ of the theoretical value of all the acid components present in the polyester before boiling. However, the products produced according to the process of the present invention prove to be quite stable under the same boiling treatment. Furthermore the products of the present invention remain elastic and only swell to a slight degree. Even after this treatment by boiling in water, the plastics produced according to the present invention may be further treated for about 20 hours with about an 0.4 N-sodium hydroxide solution without obtaining the resinous or waxy condition of degradation of the aforementioned polyester prepared products.

It is to be understood that any of the hydroxyl terminated polyethers or hydroxyl terminated polythioethers or oganic diisocyanate or compounds capable of reacting with a terminal —NCO group to form a compound having terminal NH$_2$ groups or cross-linking or chain extending compounds or additives disclosed as operable herein can be substituted in the foregoing working examples for the specific compounds set forth therein.

Although the invention has been described in considerable detail in the foregoing examples for the purpose of illustration, it is to be understood that such detail is solely for this purpose and that variations can be made therein by those skilled in the art without departing from the spirit and scope of the invention except as is set forth in the claims.

What is claimed is:

1. A method for making high molecular weight cross-linked plastics which comprises reacting a member selected from the group consisting of polyhydric polyalkylene ethers and hydroxyl terminated polythioethers, said group member having a molecular weight of at least about 500, with an organic polyisocyanate to produce an —NCO terminated reaction product, reacting said —NCO terminated reaction product with a member selected from the group consisting of ammonia, hydrazine, aliphatic diamines, cycloaliphatic diamines, aromatic diamines, N,N,dihydroxyethyl urea, N,N,dihydroxy ethyl melamine and dicyandiamide to form an adduct having ly attached to the oxygen atom of an —OR substituent wherein R is an organic radical free of interfering functional groups.

8. A method of preparing a moldable polymer which comprises copolymerizing under substantially anhydrous conditions trioxane and a vinyl ether in which a carbon atom of said vinyl group is directly attached to the oxygen atom of an —OR substituent wherein R is an organic radical free of interfering functional groups.

9. A method of preparing a moldable polymer which comprises copolymerizing under substantially anhydrous conditions trioxane with, per mol of trioxane, from 0.005 to 95 mols of a vinyl ether in which a carbon atom of said vinyl group is directly attached to the oxygen atom of an —OR substituent wherein R is an organic radical free of interfering functional groups.

10. A method of preparing a moldable polymer which comprises copolymerizing under substantially anhydrous conditions trioxane and a vinyl ether in which a carbon atom of said vinyl group is directly attached to the oxygen atom of an —OR substituent wherein R is an organic radical free of interfering functional groups and having from 1 to 20 carbon atoms.

11. A method of preparing a moldable polymer which comprises copolymerizing under substantially anhydrous conditions trioxane and vinyl isobutyl ether.

12. A method of preparing a moldable polymer which comprises copolymerizing under substantially anhydrous conditions trioxane and a vinyl ether in which a carbon atom of said vinyl group is directly attached to the oxygen atom of an —OR substituent wherein R is an organic radical free of interfering functional groups, said copolymerization being carried out in the presence of a catalyst comprising a boron fluoride coordinate complex with an organic compound in which oxygen is the donor atom.

13. A copolymer of trioxane and a vinyl ether free of interfering functional groups.

14. A water insoluble copolymer solid at room temperature consisting essentially of recurring oxymethylene groups and recurring isobutoxyethylene groups.

15. A method of preparing a moldable polymer which comprises polymerizing trioxane and from 0.005 to 95 mols, per mol of trioxane, from 0.005 to 95 mols of a vinyl ether in which a carbon atom of said vinyl group is directly attached to the oxygen atom of an —OR substituent wherein R is an organic radical free of interfering functional groups, at a temperature between about −5° C. and about 90° C. in the presence of from about 0.001 and about 1.0 weight percent of a catalyst comprising a boron fluoride coordinate complex with an organic compound in which oxygen is the donor atom, based on its boron fluoride content and upon the weight of trioxane.

References Cited in the file of this patent

UNITED STATES PATENTS

| | | |
|---|---|---|
| 2,312,743 | Arundale et al. | Mar. 2, 1943 |
| 2,543,312 | Copenhaver | Feb. 27, 1951 |
| 2,611,760 | Geiser | Sept. 23, 1952 |
| 2,653,923 | Shekleton | Sept. 29, 1953 |
| 2,936,298 | Hudgin et al. | May 10, 1960 |